J. B. BUSHNELL
DIRECTION INDICATOR FOR VEHICLES.
APPLICATION FILED DEC. 2, 1920.
1,418,531.
Patented June 6, 1922.
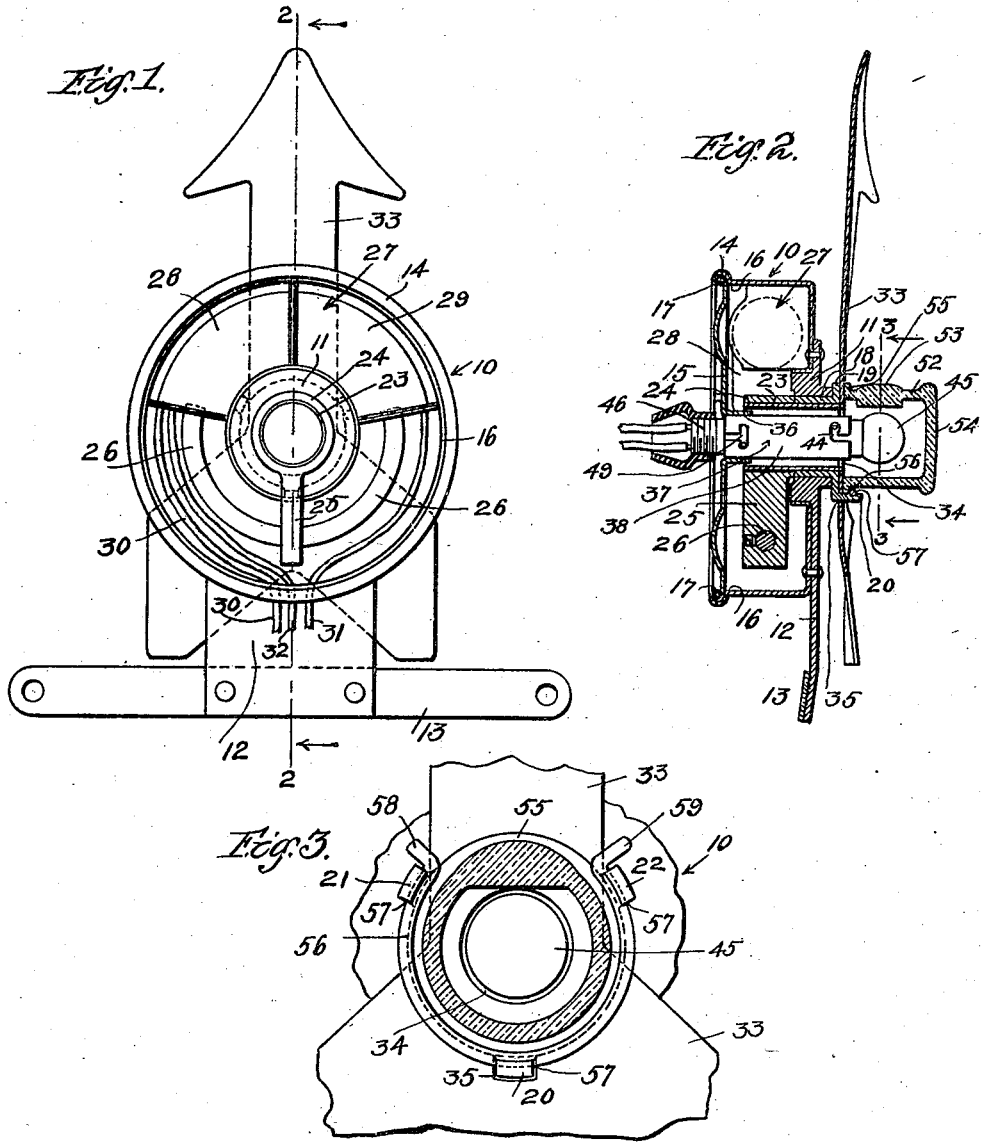
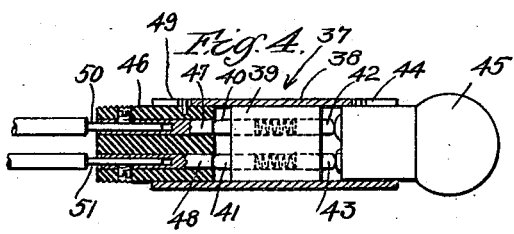
INVENTOR
John B. Bushnell
BY
ATTORNEY

UNITED STATES PATENT OFFICE.

JOHN B. BUSHNELL, OF LOS ANGELES, CALIFORNIA.

DIRECTION INDICATOR FOR VEHICLES.

1,418,531. Specification of Letters Patent. Patented June 6, 1922.

Application filed December 2, 1920. Serial No. 427,700.

*To all whom it may concern:*

Be it known that I, JOHN B. BUSHNELL, a citizen of the United States, residing at Los Angeles, in the county of Los Angeles and State of California, have invented new and useful Improvements in Direction Indicators for Vehicles, of which the following is a specification.

My invention relates to indicating devices, and is especially adapted for use on vehicles to show the direction in which the vehicle is intending to move and to point out the proposed direction of travel when passing cross roads or other dangerous places, and is also adapted to be used as a tail light for the vehicle.

The device is designed to be an improvement on the Patent No. 1,127,730, granted to Thomas W. Byrne of Los Angeles, California, on February 9th, 1915, and consists of certain details of construction, whereby the parts may be readily and expeditiously assembled, or removed without the use of tools when it is desired to renew or adjust the same.

Other objects will appear in the following description, will be pointed out in the claims and will be embodied in the accompanying drawings, in which:

Fig. 1 is a rear view of the device, the rear back plate of the casing and the illuminating fixture being removed, in order that the internal mechanism may be disclosed.

Fig. 2 is a section taken on the line 2—2 of Fig. 1, showing all of the parts in assembled relation.

Fig. 3 is an enlarged section taken on the line 3—3 of Fig. 2.

Fig. 4 is an enlarged detail section through the illuminating fixture.

My device operates in substantially the same manner and is provided with most of the same elements as the device disclosed in the above mentioned patent, and comprises a circular casing having a curved solenoid mounted therein, a curved armature mounted upon a rotatable hollow shaft adapted to move in said armature, an indicating blade mounted on said shaft, a light fixture for illuminating said indicating blade, and electric circuits for said light and for said solenoid, whereby said light may be turned on at will, and said armature may be energized to operate the indicating blade either to the right or to the left as desired.

In carrying out my invention, 10 represents a circular shell casing having secured to one of its ends a centrally disposed bearing block 11 which is provided with a downwardly disposed projection 12, to which is secured a cross bar 13, adapted to serve as a means for securing the casing to a vehicle. The opposite end of casing 10 is open and is provided with an interiorly channeled flange 14. An end plate 15 is adapted to rest against a shoulder 16 on casing 10 and to be secured in place by means of a spring wire member 17, which is sprung into the channel of flange 14, as clearly shown in Fig. 2 of the drawings.

Journaled in a bore formed in block 11 is a sleeve 18, which is provided with a flange 19 having projecting outwardly therefrom three equally disposed lugs 20, 21 and 22, and secured in the bore of said sleeve is a tube 23 which projects into the casing 10 for a suitable distance and has secured to its end a collar 24 provided with a pendulum member 25 to which is secured the curved armature 26 adapted to co-operate with a curved solenoid 27 mounted in the casing 10. The solenoid 27 is provided with separate windings 28 and 29, which connect respectively with the lead wires 30 and 31, and the common lead wire 32, as clearly shown in Fig. 1 of the drawings.

An indicating blade 33, preferably formed in the shape of an arrow, is provided with a circular aperture 34, which registers with the bore of tube 23 and an elongated aperture 35 through which the lug 20 passes. The shaft of the arrow shaped indicating blade 23 rests between the lugs 21 and 22 and is thus caused to rotate with the sleeve 18.

The end plate 15 is provided with an inturned flange 36 forming a centrally disposed aperture into which is tightly pressed the illuminating fixture 37, which comprises a tube 38 into which at its central portion is pressed an insulating plug 39, said plug being provided with spring pressed contact members 40, 41, 42 and 43. The end of tube 38, which projects through the aperture 34 in indicating blade 33, is adapted to have mounted therein by means of a bayonet joint 44, the electric light bulb 45. By this construction it will be seen that the electric light bulb 45 may be readily inserted into the end of said tube and locked in contacting relation with the contacting members 42 and 43.

A lead wire plug 46 formed of insulating material is provided with contact members 47 and 48 adapted to abut respectively with the contact members 40 and 41, and to be locked in such relation therewith by means of bayonet joint 49. The outwardly extending ends of contact members 47 and 48 are socketed to receive the wires 50 and 51, which are connected to any source of electric energy mounted on the vehicle, and may be provided with a suitable switch (not shown) for opening and closing the circuit. By this construction it will be obvious that the plug 46 may be readily withdrawn from the tube 38 when desired.

The light bulb 45 projects into a glass housing 52, said housing being provided on its peripheral surface with a lens 53 adapted to reflect the rays of light along the shaft of the arrow head indicating blade. The closed end 54 of the housing 52 may be suitably colored so that when the rays of light pass through the same the danger signal is displayed.

The opposite end of housing 52 is provided with a flange 55 adapted to rest against the indicating plate 33 and between the lugs 20, 21 and 22, and to be secured in said relation by means of the spring locking wire 56, which engages in notches 57 formed in said lugs. The ends of the wire 56 are bent at substantially right angles to the body portion, as at 58 and 59, and project over the edges of lugs 21 and 22, as clearly shown in Fig. 3 of the drawings. By this construction it will be seen that the blade 33 and the housing 52 may be readily locked to the sleeve 18, in order that they will rotate therewith, and that when it is desired to disassemble these parts it will be only necessary to grasp the ends 58 and 59 of the spring wire 56 between the thumb and forefinger and press them together, thereby eliminating the necessity of the use of bolts or screws in assembling these parts.

The arrow indicating blade is held normally in a vertical position, as shown in the drawings by the pendulum 25. When it is desired to signal that the vehicle is about to turn in one direction, an electrical circuit is closed by means of a switch (not shown) through the wires 30 and 32, which energizes the coil 28 thereby drawing the armature 26 therein to move the indicating blade. To move the indicating blade in the opposite direction a circuit is closed in the same manner through the wires 31 and 32 to energize the coil 29.

By the above recited construction it will be apparent that I have provided a device which is self contained, and which may be readily and quickly taken apart when desired to adjust any of the mechanism, and that a new light bulb may be adjusted thereto without the slightest inconvenience.

What I claim is:

1. A direction indicator, comprising a casing, a shaft journaled in said casing, an indicating blade, a lighting unit, a housing for said lighting unit, means mounted in said casing for operating said shaft, and a spring locking member for securing said housing and indicating blade to said shaft.

2. A direction indicator, comprising a casing, a shaft journaled in said casing provided at its outwardly extending end with a plurality of outwardly projecting lugs having notches formed therein, an indicating blade adapted to rest against the end of said shaft and engage the said lugs, a lighting unit, a housing for said lighting unit provided with a flange adapted to rest against said indicating blade and between said lugs, a spring locking wire adapted to rest in said notches and adjacent said flange, and means for operating said shaft.

3. A direction indicator, comprising a casing, a hollow shaft mounted in one wall of said casing, an indicating blade mounted on said shaft, a removable cover for the opposite end of said casing having an illuminating unit mounted therein adapted to project through said hollow shaft beyond said indicating blade, whereby rays of light may be projected on said blade, and means mounted in said casing for operating said shaft.

4. A direction indicator, comprising a casing, a shaft journaled in said casing, an indicating blade mounted on said shaft, a transparent housing mounted on said shaft provided with a lens, an illuminating unit projecting into said housing, whereby rays of light will be projected through said lens onto a portion of said indicating device, and means mounted in said casing for operating said shaft.

In witness that I claim the foregoing I have hereunto subscribed my name this 27th day of July, 1920.

JOHN B. BUSHNELL.